F. W. KNOWLES.
BEET HARVESTING MACHINE.
APPLICATION FILED APR. 3, 1917.

1,401,413.

Patented Dec. 27, 1921.
6 SHEETS—SHEET 1.

Fig. 1.

WITNESSES
James F. Crown,
J. P. Hollingsworth

INVENTOR
Frank W. Knowles,
BY Richard B. Owen,
ATTORNEY

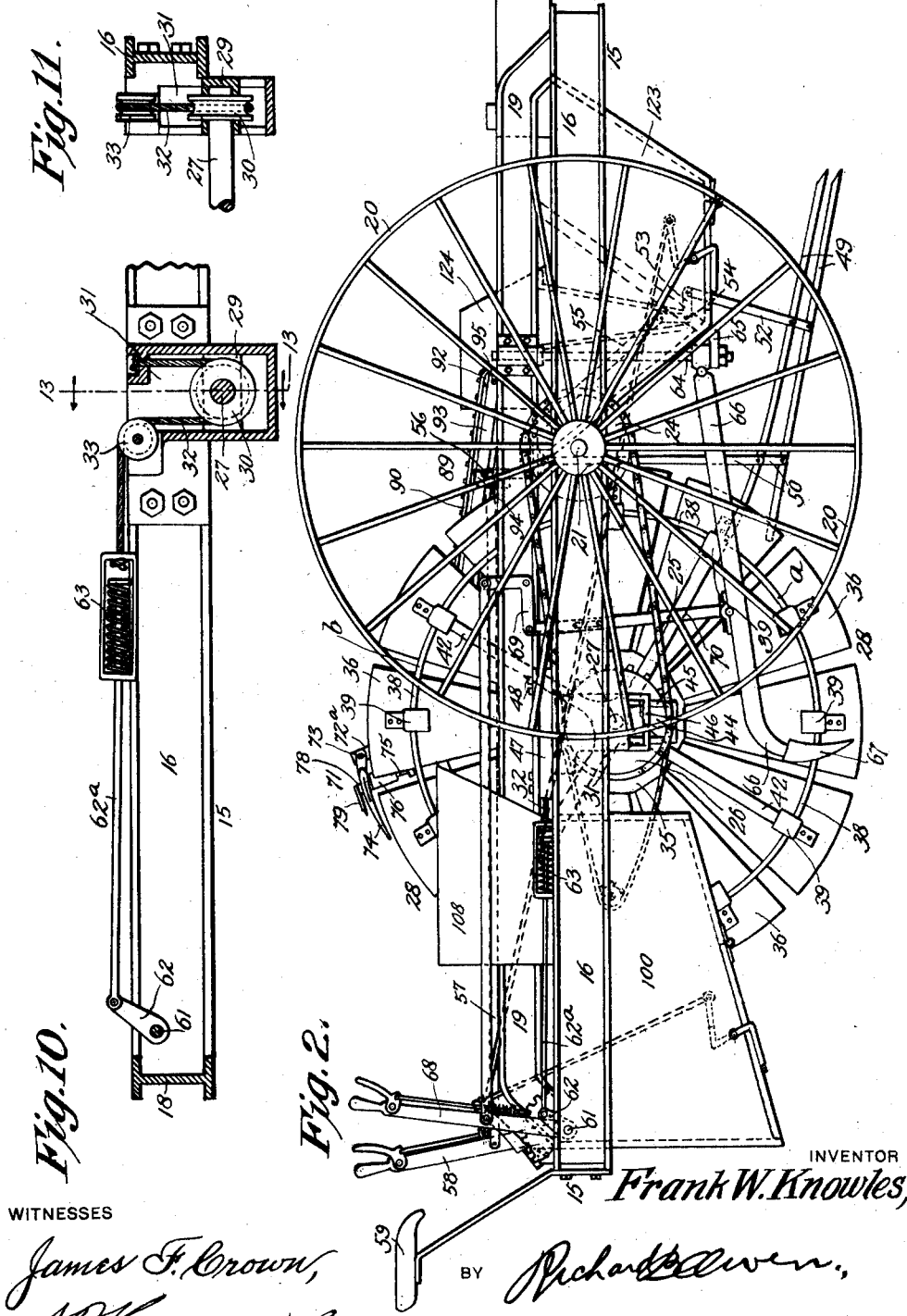

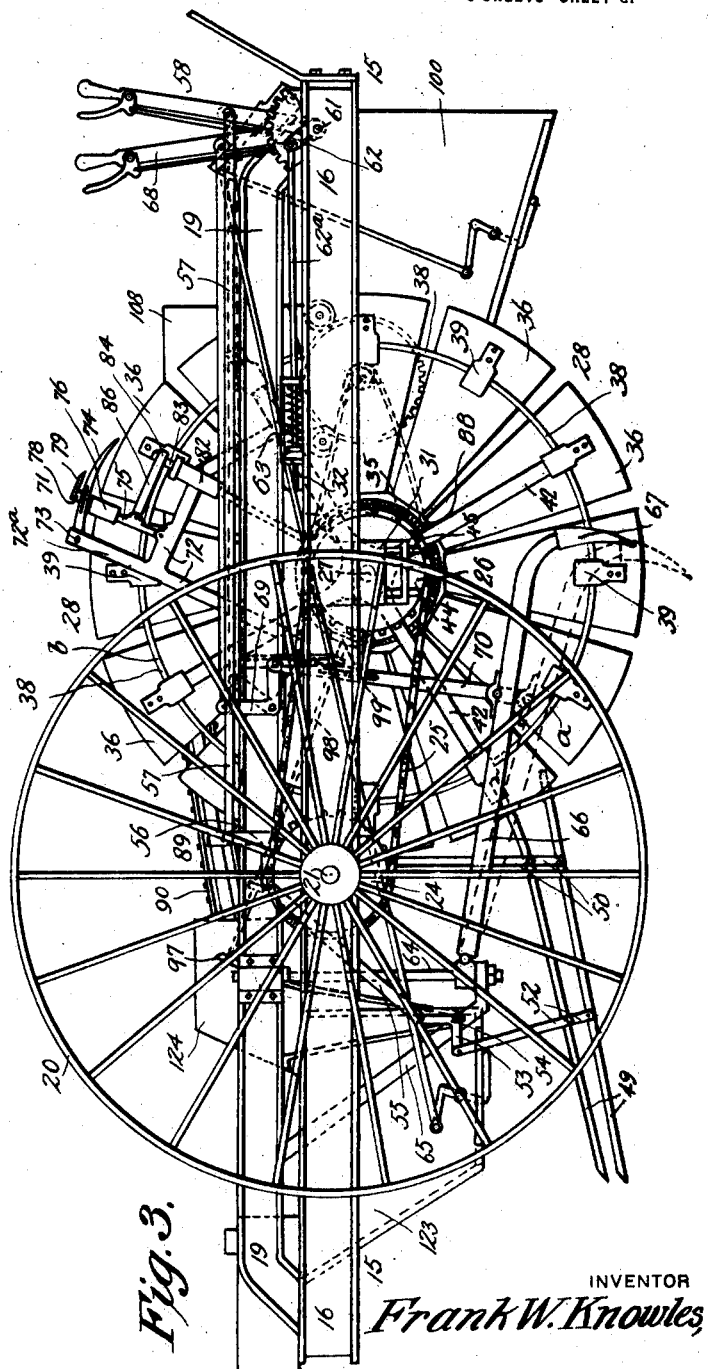

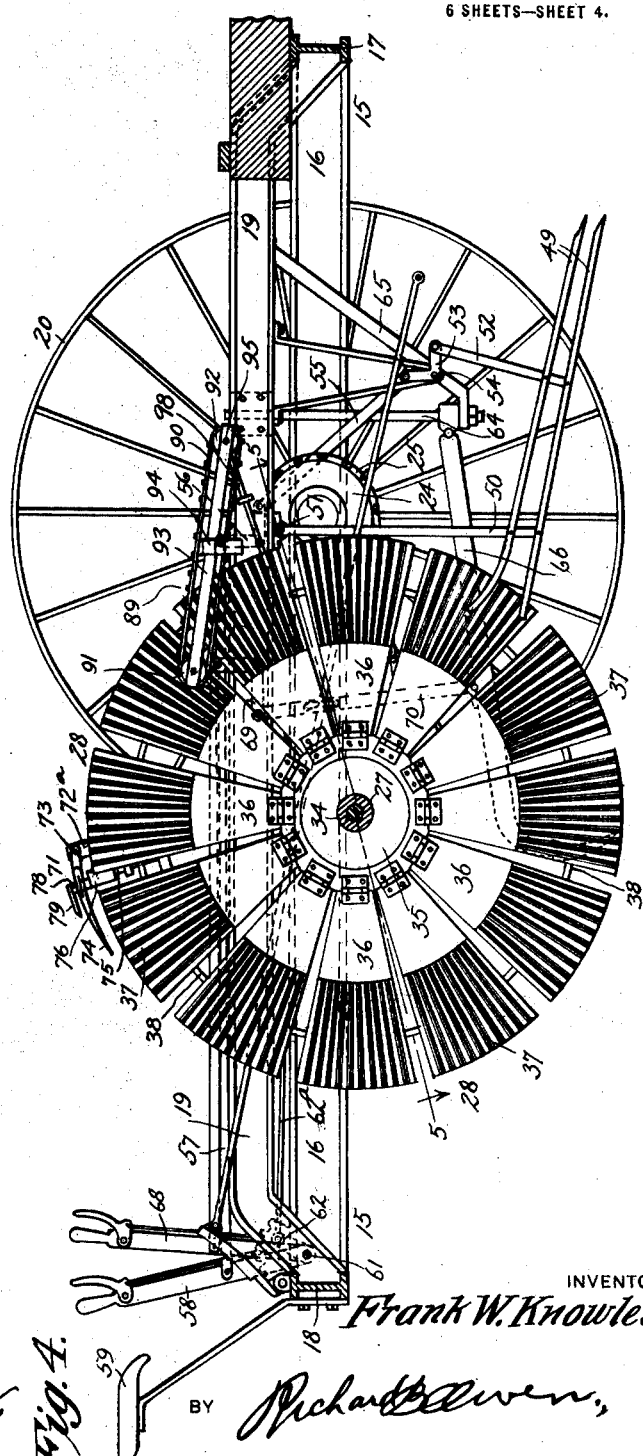

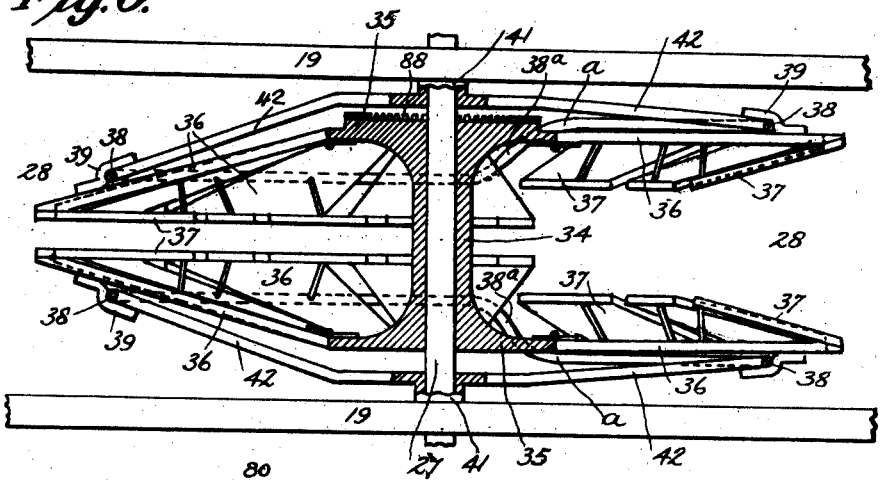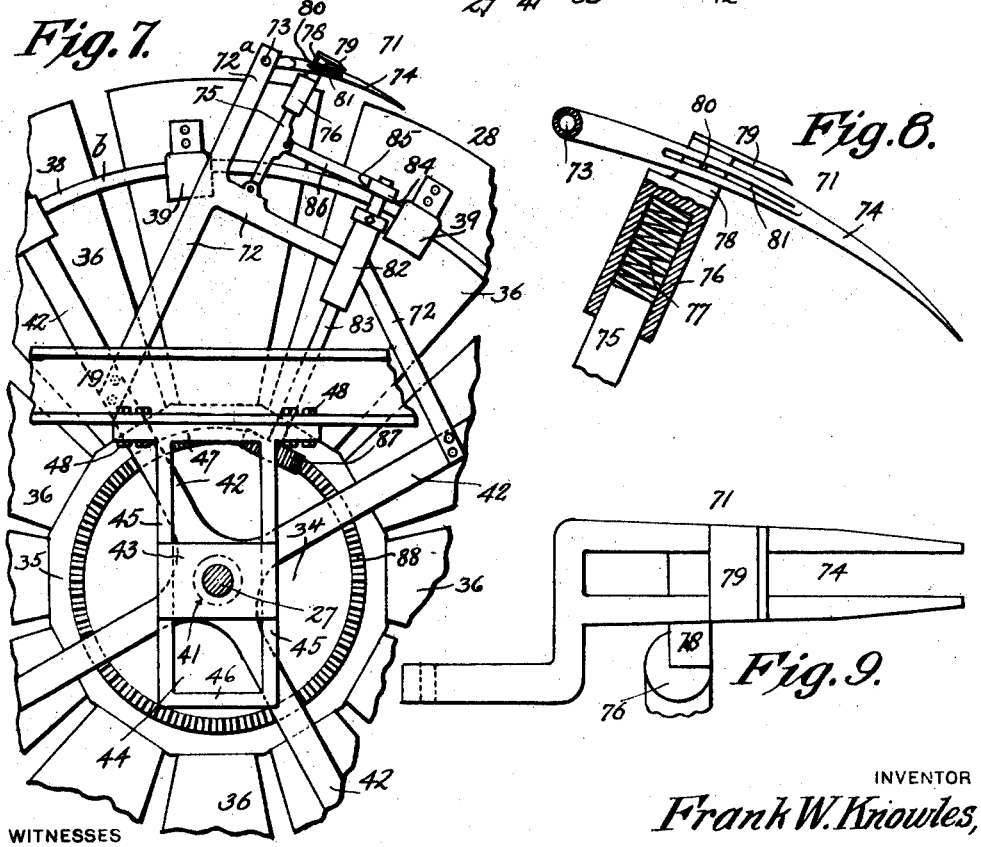

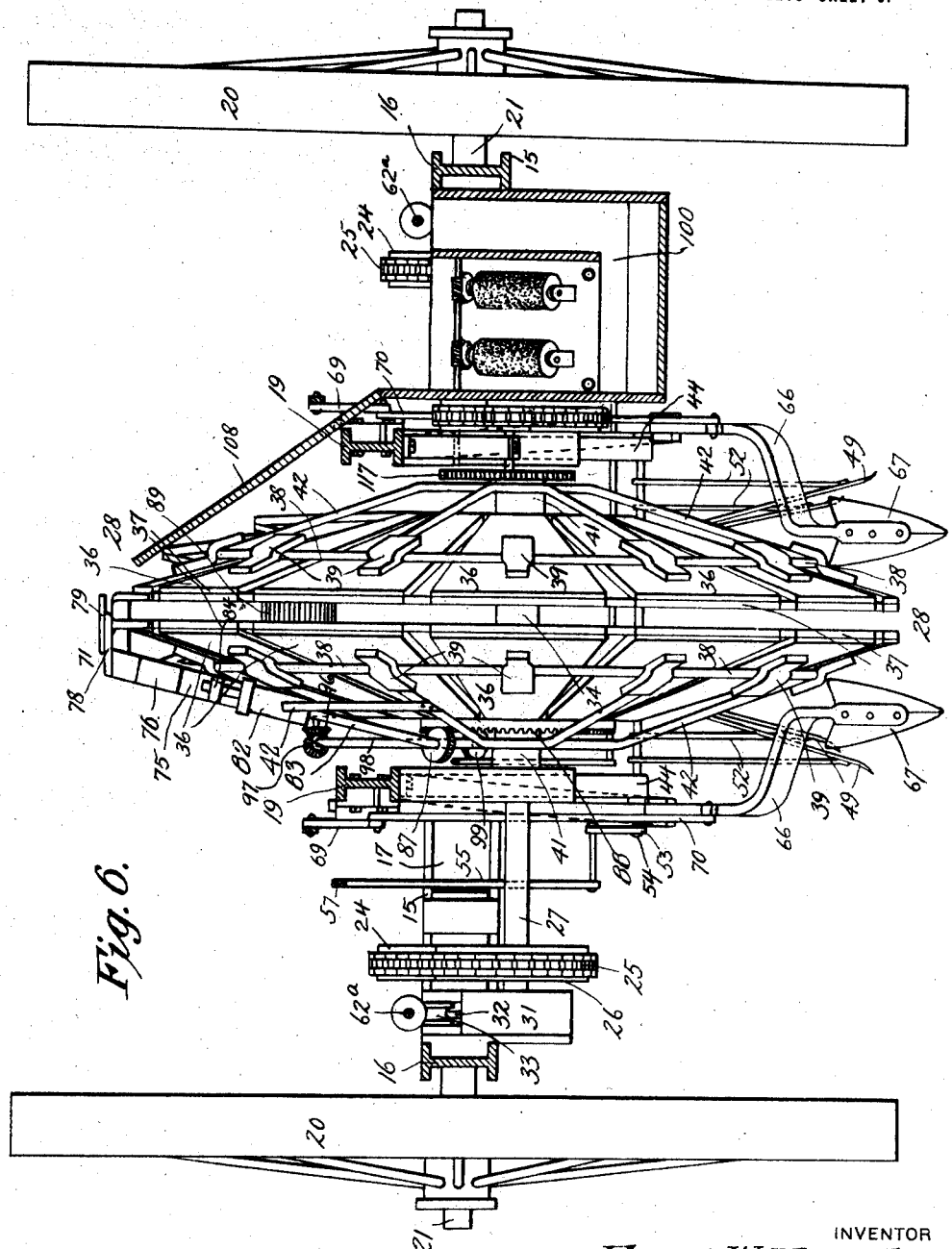

UNITED STATES PATENT OFFICE.

FRANK W. KNOWLES, OF PORTLAND, OREGON.

BEET-HARVESTING MACHINE.

1,401,413.　　　　Specification of Letters Patent.　Patented Dec. 27, 1921.

Application filed April 3, 1917. Serial No. 159,464.

*To all whom it may concern:*

Be it known that I, FRANK W. KNOWLES, a citizen of the United States, residing at Portland, in the county of Multnomah and State of Oregon, have invented certain new and useful Improvements in Beet-Harvesting Machines, of which the following is a specification.

This invention relates to beet harvesting machines, and has for its principal object to provide a machine for the purpose described mounted on ground wheels to enable the same to be drawn through a field of beets by horse or other form of power, and in passing through the field to loosen the beets growing therein, pulling them from the ground and delivering them to a cutting device for severing the tops from the beets and directing the latter to a hopper carried by the machine. The tops after the beets are severed are carried toward the opposite end of the machine and there delivered to a conveyer and from thence delivered into a hopper.

Another object of the invention is to provide in a beet topping machine of the character described means for gathering the top or foliage part of the beet plant into a bunch and hold the same thus bunched in convenient position to be gripped by the gathering wheel which pulls the beets from the ground and raises them to the cutting mechanism, by means of which the root portion is severed from the foliage portion and the respective parts delivered to hoppers at opposite ends of the machine.

A further object of the invention is to provide a beet harvesting machine mounted on a vehicle frame with ground wheels and provided with a gathering wheel driven from the ground wheels and rotating at the same speed, said gathering wheel being provided with means for gripping the tops of beets after they have been bunched by suitable devices on the machine and withdrawing the plants from the ground after the same have been loosened by suitable shovels mounted upon the vehicle frame.

A still further object of the invention is to provide a beet harvesting machine which shall be simple in construction with regard to the work to be performed, of relatively few parts and easily maintained in operative condition by a single man riding upon the vehicle.

With the above as the principal objects in view, the invention consists of the novel construction, combination, and arrangement of parts hereinafter described, pointed out in the appended claims and illustrated in the accompanying drawings, in which—

Figure 1 is a top plan view of the complete machine.

Fig. 2 is an elevation of the entire machine as viewed from the right-hand side.

Fig. 3 is a similar view as seen from the left side.

Fig. 4 is a vertical longitudinal sectional view through the machine on the line 4—4 of Fig. 1.

Fig. 5 is a horizontal sectional view enlarged through the gathering wheel on the line 5—5 of Fig. 4.

Fig. 6 is a vertical cross sectional view through the machine on the line 6—6 of Fig. 1.

Fig. 7 is an elevation of a portion of the gathering wheel as seen from the side visible in Fig. 3 and showing larger and more clearly the cutting mechanism for severing beets from the foliage.

Fig. 8 is an enlarged detail view partly in section of the cutting device.

Fig. 9 is a top plan view of so much of the cutting device as is shown in Fig. 8.

Fig. 10 is a detail longitudinal sectional view of a portion of the frame showing more clearly the elevating mechanism for the gathering wheel.

Fig. 11 is a cross sectional view on the line 13—13 of Fig. 10.

In the drawings, 15 designates the main frame of the vehicle upon which the harvester is supported. This frame comprises two outside longitudinal beams 16, a front beam 17 extending transversely between the side beams and a rear beam 18 similarly disposed between the side beams at the back of the machine. Between the forward beam 17 and rear beam 18 are two parallel longitudinal brace beams 19 that extend in a direction parallel to the side beam 16, but at a higher elevation, the ends of the braces 19 being bent downwardly for attachment to the front and rear beams 17 and 18, respectively. The longitudinal braces are secured about one-third the width of the machine from the respective sides thereof, and thus serve to greatly strengthen the main frame and provide means to which a number of the operating parts may be attached. At each side of the machine a short distance in front of the transverse center thereof is a ground wheel 20 upon which the entire machine is supported. These wheels rotate each on a short horizontal shaft 21 rotatable in turn in a bearing 22 bolted to the inner face of the side beams 16. The wheels 20 are on the outer side of the main frame and are loose on their shafts, but may be connected thereto when moving in a forward direction by a pawl and ratchet mechanism 23 of any well-known type for the purpose of permitting free movement of the wheels when the machine is forced rearwardly, or when on turning, one wheel travels at less speed than the other and thus permitting freer movement between the two drive wheels. The inner end of each shaft 21 has mounted thereon a sprocket wheel 24 for imparting motion to the beet digging wheel through sprocket chains 25 passing around the sprocket wheels 24 to other sprocket wheels 26 keyed on the shaft 27 of the gathering or pulling wheel 28. The shaft 27 of the gathering wheel 28 extends across the frame in horizontal direction, its ends terminating near the inner faces of the side frames 16 and are rotatably seated in bearing caps 29, said caps each being provided with a pulley 30 and both cap and pulley of each bearing are mounted in a housing 31 bolted to a side frame 16. A cable 32 fixed at one end to the housing and passing downwardly below the pulley 30, thence upwardly and over a second pulley 33 pivoted in the housing and to a suitable operating means hereinafter described, serves to support the shaft 27 and the gathering wheel 28 and by pulling on or releasing the cables at the two sides of the frame, the gathering wheel may be raised or lowered to the desired working position.

The gathering wheel of the present invention comprises a hub 34 mounted on the shaft 27 between the longitudinal braces 19, said hub having a wide disk-like flange 35 on each end, to the peripheral edge of which flanges are hinged circular radiating series of gripping blades 36. The blades are pivoted to their respective flanges 35 to permit free swinging movement inwardly toward each other but their outward movement is limited when said blades are in line with the flanges. Each blade has secured to its outer free end a gripping plate 37, about one-half the length of the blade and extending toward the hub at an angle to said blade on its inner side. The angle of the plates with respect to the blades carrying them is such that when opposite complementary blades are inclined toward each other into operating position, the plates 37 will lie close together and in parallel relation and serve to take firm hold of the tops or foliage of the beet plants and at the proper moment withdraw said plants from the ground. Preferably the working faces of the plates 37 are longitudinally corrugated as shown.

The movements of the blades 36 are controlled by a cam track 38 on each side of the gathering wheel 28, said tracks being of any suitable construction, but in the present instance are shown to be made each of a small metal bar of circular cross section, concentrically curved with relation to the peripheral edges of the blades 36, but having various inclinations and off-sets 38ª to and from the blades in order to cause the blades to travel in the proper direction as the gathering wheel rotates. Each blade has a hook-like member 39 fastened thereto near its outer end, the inner end of said member terminating as a finger to overlie the track 38 and to maintain the blade at all times in full operative engagement therewith. Each cam track 38 is mounted at one end of a hub 41 by means of radial arms 42 which extend from said hub to the track. The opposite end of each hub is furnished with a grooved sliding member 43 adapted to move vertically in a frame 44 bolted to the underside of a longitudinal brace 19, there being two of these guides, one on the under side of each brace. Each guide is formed of two vertical girders 45 spaced apart to permit easy movement of the slides 43 therebetween and connected together at the bottom by a cross piece 46 and at the top by a longer cross piece 47, through which bolts 48 pass for securing the guide to the longitudinal brace.

In front of the gathering wheel 28 and inclining downwardly and forwardly therefrom toward the ground are long fingers 49, disposed as shown, two on each side of the central line of the machine and between which the tops or foliage of the beets pass and which serve to collect the foliage into bunches for convenient gathering by the wheel. These foliage gatherers are suspended near their rear ends from links 50 pivoted at 51 to the longitudinal braces 19. Near the outer ends of the foliage gatherers are other links 52 pivoted thereto at their lower ends and at their upper ends to rocking levers 53, mounted on a shaft 54 pivoted to a fixed portion of the frame. A second link 55 is connected to an upright arm on the shaft 54 and extends upwardly to a bell-crank lever 56 pivoted on the frame 19 and from which an operating rod 57 extends rearwardly to a hand-lever 58 pivoted to the frame adjacent the operator's seat 59.

A second lever 60 adjacent the seat 59 and maintained in any desired position by a locking pawl and sector 60ª is affixed on a horizontal shaft 61 turning in bearings at the rear of the frame and having upstanding arms 62, each connected by a rod 62ª to the cable 32 that passes under the axle of the gathering wheel and serves to raise and lower the latter. Between the cable connection and the rod 62ª is placed a compression spring 63 which serves to cushion the weight of the gathering wheel, the spring being sufficiently stiff to permit the raising and lowering of the wheel without difficulty or undue yielding on the part of the spring and so interfere with the vertical movement of said wheel.

In front of the gathering wheel 28 and fixed to each longitudinal brace is a depending vertical hanger 64, the lower ends of said hangers being each maintained in rigid position by upwardly inclined braces 65 connected to the bottom of the hanger. Mounted on each hanger is the forward end of a plow beam 66 the rear end of said beam carrying a shovel 67 which may be raised and lowered and when lowered serves to loosen the ground on each side of the beet plants, the shovel, as will be seen from the drawings, being directly under the shaft 27 of the gathering wheel and when lowered will engage the earth to loosen the same at the same time the gripping blades begin to pull the beet from the earth. The plows are each raised and lowered as required by manipulating a lever 68 near the seat 59, from which lever a link passes to a bell-crank lever 69 and from said lever a second link 70 passes downwardly to be attached to the plow beam.

After the beets have been pulled from the ground, they are severed from the tops by a cutting mechanism 71 illustrated in Figs. 7, 8 and 9. In these views is shown a supporting frame 72 bolted at its lower end to two of the arms 42 on which the cam track 38 on one side of the machine is mounted adjacent the gathering wheel, said frame having an arm 72ª continued upwardly above the periphery of the gathering wheel and to this arm is pivoted at 73 a bifurcated finger or feeler 74, the two fingers overlying the series of blades 36 on the two sides of the gathering wheel, the space between the fingers being of a width to permit the beet tops where they spring from the beet to pass between. Pivoted to the frame 72 below the edge of the gathering wheel is an outwardly projecting rod 75 over the outer end of which is slidably mounted a spring casing 76, while within the casing is placed a coil spring 77, the ends of which press respectively against the outer end of the rod 75 and the bottom of the casing 76. On the outer end of the casing 76 is a bracket 78 that extends between the fingers of the feeler, and mounted on the end of the bracket is a knife 79, the forward or cutting edge of which projects beyond the bracket toward the rear of the machine. At one side of the bracket 78 is fixed a pin 80 movable in a curved longitudinal slot 81 in one of the fingers of the feeler as shown. Forming a part of the frame 72 is a bearing 82, within which a shaft 83 rotates. Fixed to the upper end of this shaft is an eccentric 84, about which passes an eccentric strap 85 connected by a short bar 86 with the knife rod 75. The lower end of the shaft 83 carries a pinion 87 that is driven by a spur gear 88 mounted on the hub flange 35 on the same side of the machine.

Between the two series of blades 36 of the gathering wheel on the opposite side of the shaft from the cutting mechanism is an endless conveyer 89 for removing the tops from the machine after the beets have been cut therefrom. This conveyer comprises a belt 90 rotatable about two drums 91 and 92 mounted on shafts carried in the ends of a spreader bar 93, seated between the upper and lower runs of the belt, said spreader bar being supported on a cross girder 94 bolted to the tops to the two longitudinal braces 19. One of the shafts 95 carrying the drum 92 extends beyond the spreader frame toward one side of the machine and terminates in a beveled pinion 96 that meshes with a like pinion 97 on a longitudinal downwardly inclined shaft 98 that runs toward the spur gear 88 and carries a pinion 99 on its ends to mesh with said spur gear for the purpose of driving the conveyer when the machine is in operation.

On the side of the machine opposite the cutting mechanism and in rear of the shaft 27 is a hopper 100, open at its top, the upper edge of which is substantially in line with the top of the side girder 16.

Extending upwardly from the forward end of the hopper 100 is an inclined platform 108, the upper end terminating close to the blades 36 on the same side of the machine below the cutting mechanism for the purpose of receiving the beets after they have been severed from the tops and directing them into the hopper 100.

At the forward end of the machine in front of the hopper 100 and on the same side is a second hopper 123 from which a receiving platform 124 extends upwardly and in inclined direction below the forward end of the endless conveyer and receives the tops from said conveyer and conducts them into the hopper 123.

A machine such as described is operated by drawing the same through a field of beets by horses or other power, the machine passing successively over the rows of beets, and as it is drawn along, the foliage carriers 49 with their forward ends near the ground pass below the leaves of the beet plants and having an upward inclination and converging somewhat toward their rear ends, these leaves are brought into a more or less close bunch to enable them to readily pass between the gripping blades 36 of the gathering wheel 28. The forward movement of the machine will, of course, turn the ground wheels 20, and these wheels through their connection by the sprocket chains 25 with the gathering wheel 28 will rotate the gathering wheel at the same speed as the ground wheels. The gripping blades 36 projecting radially from the hub flanges 35 are guided in a manner hereinafter described, by the two cam tracks 38 to move toward and from each other at proper time to firmly grip the leaves or foliage of the beet plants and withdraw the plants from the ground. The gathering wheel then carries the plants to the cutting mechanism where the beets are severed from the tops and fall into the hopper 100. The tops, still carried by the gathering wheel, are later dropped on the conveyer 90 and finally delivered into the hopper 123.

As shown in the drawings, the gripping blades 36 as they are rotated by the gripping wheel, will, when they arrive in front of the shaft 27, be at their greatest distance apart and will lie in planes parallel to the hub flanges 35. The gripping plates 37 on the inner sides of these gripping blades converge inwardly being separated widest at their outer ends to permit the ready entrance therebetween of the beet foliage as it passes from the foliage gatherers 49. Rotation of the gathering wheel will carry the supported gripping plates 37 downwardly and rearwardly and then upwardly to a point a on the cam tracks, see Figs. 2 and 3, where said tracks begin to approach each other. This convergence of the tracks presses the opposite series of gripping blades 36 toward each other, causing the blades to swing on their hinged connections until the gripping plates 37 are brought to rest in parallel relation and sufficiently close together to grip firmly the foliage or leaves of the beet plants. At this time the gripping blades will be immediately below the shaft 27 and on the point rising toward the rear of the wheel for withdrawing the beet plants from the ground. To assist this operation the plow beams 66 are lowered so that the shovels 67 will enter the ground on each side of the gathering wheel and sufficiently close thereto to break up and loosen the earth around the beet plants so that the beets may be withdrawn without danger of breaking the leaves from the roots.

After the beets have been unearthed they are carried upwardly by the rotation of the gathering wheel until near the highest point in its revolution, where the beets projecting radially from the gripping blades 36, encounter the bifurcated feelers or fingers 74. The leaves of the beet plants pass between the fingers of the feeler close to the root and approach a knife 79 which being given constant and rapid reciprocation through the eccentric 84 slices the beet from the foliage. The beets are thrown to one side of the gathering wheel upon the inclined platform 108 and fall into the hopper 100.

The foliage or leaves of the beet plants after the roots have been severed therefrom are carried around by the gripping blades 36 until the endless conveyer 90 has been reached at which point the cam tracks 38 are bent outwardly as at b to cause the blades 38 to separate and release the beet tops which fall upon the conveyer 90 and are carried forwardly thereon to the inclined receiving platform 124 from which the tops slip downwardly into the hopper 123.

What I claim is:

1. In a beet harvesting machine, a revolving gripping device for grasping the tops of beet plants and withdrawing said plants from the ground, cutting means for severing the beets from their tops and delivering the beets to a receptacle, and vibratory means for reciprocating said cutting means operated by the rotation of the gripping device.

2. In a beet harvesting machine, a vertically adjustable revolving gripping device for grasping the tops of beet plants and withdrawing said plants from the ground, and cutting means for severing the beets from their tops and delivering the beets to a receptacle, said cutting means extending across the periphery of the gripping device and reciprocable in the line of movement of said device, a supporting frame adjustable with the gripping device, a rod for mounting the cutting means pivotally secured to said supporting frame, a shaft journaled in said supporting frame, an eccentric on said shaft and connections therefrom to said rod for vibrating said rod and reciprocating the cutting means, and driving connections between the revolving gripping device and said shaft.

3. In a beet harvesting machine, a vertically adjustable revolving gripping device, and cutting means for severing the beets from their tops and delivering the beets to a receptacle, said cutting means reciprocable in the line of movement of the revolving gripping mechanism, a frame adjustable with the gripping device, a rod for mounting said cutter pivoted at one end to said frame, a shaft rotatable in bearings carried by said supporting frame, means actuated by said shaft for reciprocating said cutter, driving means between the gripping device and said shaft, a bifurcated feeler immediately below said cutter pivoted at one end to said supporting frame, the fingers of which pass on opposite sides of said rod and beyond the cutter in position to receive between them the beet plants and to coöperate with said cutter to cut the tops from the beets, and means between the cutter carrying arm and said feeler to vibrate the latter perpendicularly to the reciprocations of the cutter.

In testimony whereof I affix my signature in presence of two witnesses.

FRANK W. KNOWLES.

Witnesses:
 THERESA CURRY BARKER,
 S. BRUCE WRIGHT.